United States Patent
Choi et al.

(10) Patent No.: US 6,391,495 B1
(45) Date of Patent: May 21, 2002

(54) NEGATIVE ACTIVE MATERIAL FOR LITHIUM SECONDARY BATTERY, METHOD OF PREPARING THE SAME AND LITHIUM SECONDARY BATTERY COMPRISING THE SAME

(75) Inventors: Wan-Uk Choi, Suwon-si; Kyou-Yoon Sheem, Cheonan-si; Sang-Young Yoon, Cheonan-si; Jae-Yul Ryu, Cheonan-si, all of (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/448,315

(22) Filed: Nov. 23, 1999

(30) Foreign Application Priority Data

Nov. 25, 1998 (KR) .............................. 98-50653
Feb. 19, 1999 (KR) .............................. 99-5564

(51) Int. Cl.$^7$ ................................. H01M 4/58

(52) U.S. Cl. ................ 429/231.4; 429/231.8; 423/448; 427/113

(58) Field of Search ........................ 429/231.8, 231.4, 429/218.1, 231.95; 428/408; 423/448; 427/113

(56) References Cited

U.S. PATENT DOCUMENTS 5,962,167 A * 10/1999 Nakai et al. .............. 429/231.1
5,998,064 A * 12/1999 Amine et al. .............. 429/218.1
6,258,487 B1 * 7/2001 Kitoh et al. ................. 429/233

FOREIGN PATENT DOCUMENTS

| JP | 10-214615 | * 8/1993 | ............ H01M/4/02 |
| JP | 9-27316 | * 1/1997 | ............ H01M/4/02 |
| JP | 10-270019 | * 10/1998 | ............ H01M/4/02 |

* cited by examiner

Primary Examiner—Stephen Kalafut
Assistant Examiner—Raymond Alejandro
(74) Attorney, Agent, or Firm—Blakely Sokoloff Taylor & Zafman

(57) ABSTRACT

A negative active material for a lithium secondary battery includes a crystalline graphite core and a carbon shell. The carbon shell includes at least one material selected from a transition metal, an alkali metal, an alkaline earth metal, an element of Group 3B of the Periodic table, an element of Group 4B, an element of Group 5B or a mixture thereof. The carbon shell is a turbostratic carbon layer, or am amorphous or crystalline carbon layer having different physical properties from the core. The negative active material can be used in a lithium secondary battery such that the battery has a large discharge capacity and a high charge/discharge efficiency.

5 Claims, 1 Drawing Sheet

NEGATIVE ACTIVE MATERIAL FOR LITHIUM SECONDARY BATTERY, METHOD OF PREPARING THE SAME AND LITHIUM SECONDARY BATTERY COMPRISING THE SAME

CROSS REFERENCE TO RELATED APPLICATION

This application is based on application Nos. 98-50653 and 99-5564 filed in the Korean Industrial Property Office on Nov. 25, 1998 and Feb. 10, 1999, the content of which is incorporated hereinto by reference.

BACKGROUND OF THE INVENTION (a) Field of the Invention

The present invention relates to a negative active material for a lithium secondary battery, a method of preparing the same and a lithium secondary battery comprising the same and, more particularly, to a negative active material for a lithium secondary battery having a high discharge capacity as well as high charge and discharge efficiencies.

(b) Description of the Related Art

Metallic lithium was used in the past for negative active material in a lithium secondary battery. However, lithium metal has good reactivity toward electrolyte and deposits to form a dendric layer which increases the reactivity of lithium. There are at least two disadvantageous effects that arise from the reaction of lithium with electrolyte: the exothermic liberation of heat and the formation of a passive film on the negative electrode. The formation of passive films on lithium is recognized as one of the reasons for the loss of capacity of lithium cells on repeated cycling.

The problem of lithium reactivity toward the electrolyte is addressed by replacing lithium metal with carbon-based materials. With the use of carbon-based active materials, the potential safety problem present in metallic lithium-based batteries can be prevented while achieving a relatively higher energy density as well as a reasonable shelf life. However, carbon-based material exhibits a relatively lower discharge capacity, and charge and discharge efficiency.

The choice of electrolyte solvents is critical to the battery performance. When propylene carbonate is employed for the electrolyte solvent, the graphite-based negative active material is prone to excessively react with propylene carbonate. Therefore, the available candidates of electrolyte solvents for ensuring a relatively stable reaction are ethylene carbonate, dimethyl carbonate, ethyl methyl carbonate and diethyl carbonate. Among these materials, ethylene carbonate is usually recommended for use as the electrolyte solvent as it ensures a reasonable cycle life of the battery. However, ethylene carbonate has a disadvantage in that as its content increases, the freezing point of the electrolyte is elevated. This is due to the fact that ethylene carbonate has a high melting point exceeding the ambient temperature.

In order to solve such problems, ethylene carbonate is replaced by propylene carbonate. However, propylene carbonate excessively reacts with the graphite-based active material.

SUMMARY OF THE INVENTION

It is an object of the present invention to provide a negative active material for a lithium secondary battery having a high discharge capacity as well as high charge and discharge efficiencies.

It is another object of the present invention to provide a method of preparing the negative active material for a lithium secondary battery.

It is still another object of the present invention to provide a lithium secondary battery including the negative active material.

In order to achieve these objects, the present invention provides a negative active material for a lithium secondary battery including a crystalline graphite core and a carbon shell formed around the core. The carbon shell includes at least one material selected from a transition metal, an alkali metal, an alkaline earth metal, an element of Group 3B of the Periodic table, an element of Group 4B, an element of Group 5B or a mixture thereof. The carbon shell is a turbostratic carbon layer, or an amorphous or crystalline carbon layer having different physical properties from the core.

The present invention provides a method of preparing a negative active material for a lithium secondary battery. In the method, an additive material is dissolved in water or an organic solvent, and the additive solution is mixed with a carbonaceous material. The additive material includes at least one material selected from a transition metal, an alkali metal, an alkaline earth metal, an element of Group 3B of the Periodic table, an element of Group 4B, an element of Group 5B or a mixture thereof. The carbonaceous material is natural graphite, artificial graphite, cokes, soft carbon, hard carbon or a mixture thereof. The mixture is dried, thereby doping the additive material on the surface of the carbonaceous material, and then heat-treated. The drying step of the mixture may be a spray-drying step.

The present invention further provides a lithium secondary battery including a negative electrode with the negative active material. The lithium secondary battery includes a positive electrode with a transition metal oxide-based active material. The separator is interposed between the negative and positive electrodes. The positive and negative electrodes and the separator are immersed in an electrolyte. The electrolyte includes propylene carbonate or ethylene carbonate and a lithium salt.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
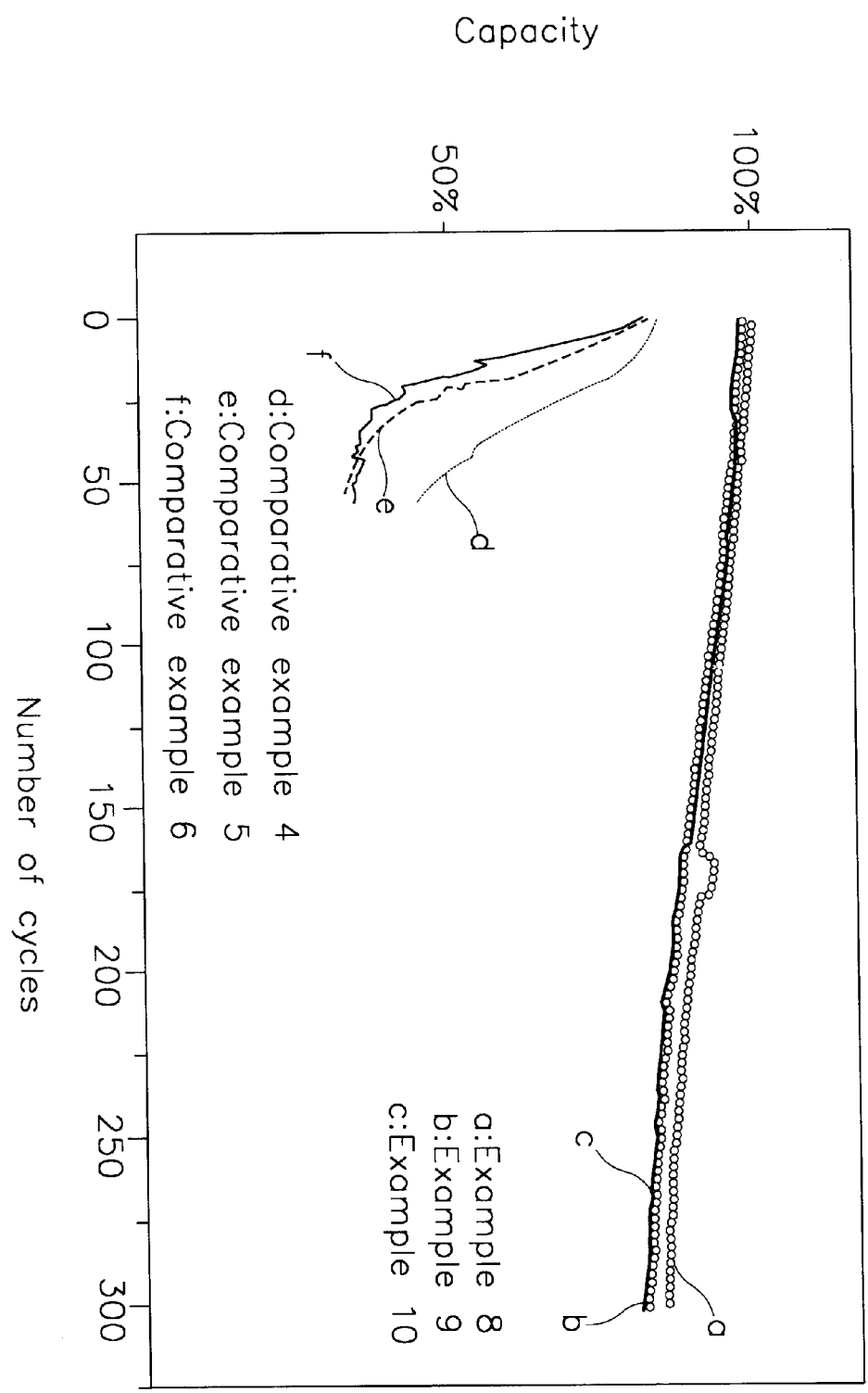
FIG. 1 is a graph showing a capacity according to charge and discharge cycles of lithium secondary batteries of Examples and Comparative examples of the present invention.

The negative active material of the present invention includes a crystalline core and a carbon shell. The carbon shell has a turbostatic carbon layer, or an amorphous or crystalline carbon layer having different physical properties from the core. The carbon shell includes a material selected from the group consisting of a transition metal, an alkali metal, an alkali earth metal, an element of Group 3B of the Periodic table, an element of Group 4B, an element of Group 5B and a mixture thereof.

The method of preparing the negative active material will now be described in detail.

An additive material is dissolved in water or an organic solvent. The additive material includes at least one material selected from a transition metal, an alkali metal, an alkaline earth metal, an element of Group 3B of the Periodic table, an element of Group 4B, an element of Group 5B or a mixture thereof. The transition metal may be Ni, Co, Fe, Mo, Cr, Ti, Zr, Sc, V or a mixture thereof, the alkali metal may be Na, K or a mixture thereof and the alkali earth metal may be Mg, Ca or a mixture thereof. The element of Group 3B may be B, Al, Ga or a mixture thereof, the element of Group 4B may be Si, Ge, Sn or the mixture thereof, the element of Group 5B may be P.

The additive material including B as the material may be boric acid or boron oxide; the additive material including Ni as the material may be nickel nitrate, nickel sulfate or nickel acetate; and the additive material including Si as the material may be silicate. The additive material is used in an amount of 0.1–20 wt. % of the carbonaceous material. The organic solvent may be ethanol, isopropyl alcohol, toluene, benzene, hexane or tetrahydrofuran.

The additive solution is mixed with a carbonaceous material. The mixture is then dried, thereby doping the additive material on the surface of the carbonaceous material. The mixing step may be a dipping or a shaking steps and the drying step may be a spray-drying step. The carbonaceous material may be natural graphite, artificial graphite, cokes, soft carbon, hard carbon or a mixture thereof. The additive material extracted on the carbonaceous material preferably has a particle size of 5 $\mu$m or less, more preferably 2 $\mu$m or less.

After the above, the resulting carbonaceous material is heat-treated. During the heat-treating process, the material reacts with the carbonaceous material to form a turbostratic carbon layer, or an amorphous or crystalline carbon layer, having different physical properties from the core, on the surface of the carbonaceous material. The turbostratic structure is characterized by a quasi-amorphous state and a more or less disordered orientation due to a radically low level of crystallization and a minimal crystalline size. The different physical property of the crystalline graphite from the core refers to a different crystallinity or crystal structure form from the core. When the natural graphite or artificial graphite is used as the carbonaceous material, the heating step is preferably performed at 700–3000° C. When cokes, soft carbon or hard carbon is used as the carbonaceous material, the heating step is preferably performed at 2000–3000° C. to promote the formation of the crystalline graphite core.

The produced active material includes 50–99 wt % of the crystalline graphite core and 1–50 wt % of the carbon shell. The carbon cell is a turbostratic carbon layer, or an amorphous or crystalline carbon layer having different physical properties from the core. When the carbon shell is less than 1 wt %, a discharge capacity and a charge/discharge efficiency of the active material may be decreased. When the carbon shell is more than 50 wt %, discharge voltage flatness becomes poor. An X-ray diffraction intensity ratio of (110) plane to (002) plane of the active material of the present invention is 0.04 or less. A Raman Spectroscopy intensity ratio I(1360)/I(1580) of the core is 0.3 or less and the corresponding intensity ratio of the carbon surface is 0.2 or less.

Using the negative active material, a negative electrode is produced. A lithium secondary battery according to the present invention is provided with the negative electrode. Transition metal oxide such as $LiCoO_2$, $LiNiO_2$, $LiMn_2O_4$ or $LiNi_xCo_{1-x}O_y$ (x=0 to 1, y=1.5 to 2.2) is used for the positive electrode as an active material. A separator is interposed between the positive and negative electrodes to separate them from each other. The positive and negative electrodes as well as the separator are all saturated with electrolyte. Cyclic carbonate is used as an organic solvent in the electrolyte and lithium salt is dissolved in the organic solvent as an electrolyte component. The cyclic carbonate includes propylene carbonate (PC) or ethylene carbonate (EC). The electrolyte may include chain carbonate such as dimethyl carbonate (DMC), ethyl methyl carbonate (EMC), diethyl carbonate (DEC) or a mixture thereof. Conventionally, propylene carbonate is difficulty used for an electrolyte in the lithium secondary battery because it excessively reacts with the graphite-based active material. In the present invention, this problem is addressed by using a negative active material including a core and a carbon shell which is formed around the core and is a turbostratic carbon layer, or an amorphous or crystalline carbon layer having different physical properties from the core. Lithium salt such as $LiPF_6$, $LiBF_4$, $LiAsF_6$ or a mixture thereof is dissolved in the organic solvent to act as the electrolyte component.

The following examples further illustrate the present invention.

EXAMPLE 1

Boric acid was dissolved in distilled water to produce a boric acid solution, and then natural graphite powder was mixed with the boric acid solution. The resulting solution was dried to evaporate distilled water such that the boric acid particles were deposited on a surface of the natural graphite. The deposited particles had a particle size of 5 $\mu$m or less. The natural graphite deposited with the boric acid particles was heat-treated at 2600° C. under an inert atmosphere. As a result, a negative active material was produced.

A negative active material slurry was prepared by adding the negative active material to a solution comprising N-methyl pyrrolidone as a solvent and polyvinylidenefluoride as a binder. A negative electrode was prepared by coating the negative active material slurry on a copper current collector and drying. Next, a rechargeable lithium half-type cell was prepared using the negative electrode plate together with a current electrode plate made of lithium metal foil, and electrolyte of 1M $LiPF_6$ in an organic solvent of ethylene carbonate and dimethyl carbonate.

EXAMPLE 2

Example 1 was repeated except that natural graphite was replaced with artificial graphite.

EXAMPLE 3

Example 2 was repeated except that boric acid was replaced with nickel nitrate.

EXAMPLE 4

Example 2 was repeated except that boric acid was replaced with silicate and a heating step was performed at temperature of 2600° C. instead of 1700° C.

EXAMPLE 5

Example 1 was repeated except that natural graphite was replaced with cokes.

EXAMPLE 6

Example 5 was repeated except that boric acid was replaced with nickel nitrate.

EXAMPLE 7

Example 5 was repeated except that boric acid was replaced with silicate.

Comparative Example 1

Example 1 was repeated except that natural graphite was used as negative active material.

Comparative Example 2

Example 1 was repeated except that artificial graphite was used as negative active material.

Comparative Example 3

Example 1 was repeated except that cokes powder was used as negative active material.

Discharge capacities of cells according to Examples 1–7 and Comparative examples 1–3 were measured. The results are shown in Table 1.

TABLE 1

|  | Discharge capacity [mAh/g] |
|---|---|
| Example 1 | 352 |
| Example 2 | 320 |
| Example 3 | 335 |
| Example 4 | 313 |
| Example 5 | 338 |
| Example 6 | 335 |
| Example 7 | 290 |
| Comparative Example 1 | 347 |
| Comparative Example 2 | 303 |
| Comparative Example 3 | 280 |

As shown in Table 1, the cells of Examples 1–8 have larger discharge capacities than that of Comparative examples 1–4.

Furthermore, the charge and discharge efficiencies of the cells according to Examples 1–2, Examples 5–7 and Comparative examples 1–3 were measured. The charge and discharge efficiencies of the cells of Examples 1–2 and Examples 5–7 were 79.3%, 82.2%, 87%, 86.3% and 61.3%, respectively. Those of the cells of Comparative examples 1–3 were 51%, 60% and 57%, respectively. Namely, the cell of Example has higher the charge and discharge efficiency than that of Comparative example. It is believed that active materials of Examples 1–7 have a crystalline graphite core and a carbon shell with a turbostratic carbon layer, or an amorphous carbon or crystalline graphite layer having different physical properties from the core.

EXAMPLE 8

Boric acid was dissolved in distilled water to produce a boric acid solution, and then natural graphite powder was mixed with the boric acid solution. The resulting solution was dried to evaporate the distilled water such that boric acid particles were deposited on a surface of the natural graphite. The deposited particles had a particle size of 5 $\mu$m or less. The natural graphite deposited with the boric acid particles was heat-treated at 2600° C. under an inert atmosphere. As a result, a negative active material was produced.

A negative active material slurry was prepared by adding the negative active material to a solution comprising N-methyl pyrrolidone as a solvent and polyvinylidenefluoride as a binder. A negative electrode was prepared by coating the negative active material slurry on a copper current collector and drying.

$LiCoO_2$, a polyvinylidenefluoride binder and N-methylpyrrolidone were mixed to be thereby made into a slurry. The slurry was then coated on a collector made of Al foil to thereby form a negative electrode plate.

Next, a 18650 cylindrical lithium secondary cell was prepared using the negative and positive electrodes, a porous polymer membrane for a separator, and electrolyte of 1M $LiPF_6$ in an organic solvent of ethylene carbonate and dimethyl carbonate.

EXAMPLE 9

Example 8 was repeated except that natural graphite was replaced with artificial graphite.

EXAMPLE 10

Example 8 was repeated except that natural graphite was replaced with cokes.

Comparative Example 4

Example 8 was repeated except that natural graphite was used as a negative active material.

Comparative Example 5

Comparative Example 4 was repeated except that artificial graphite was used as a negative active material.

Comparative Example 6

Comparative Example 4 was repeated except that cokes powder was used as a negative active material.

Capacities according to a number of charge and discharge cycles of cells of Examples 8–10 and Comparative examples 4–6 were measured and the results are presented in FIG. 1. As shown in FIG. 1, the lithium secondary cell of Examples 8–10 barely decrease in capacity according to the number of charge and discharge cycles, whereas the lithium secondary cell of Comparative examples 4–6 exhibit significant decrease in capacity. Accordingly, it is shown that the cycle life of the lithium secondary battery of the present invention is longer than Comparative examples.

The present invention provides a negative active material for a lithium ion battery having a relatively large discharge capacity and high charge/discharge efficiency. In addition, the active material is applicable to propylene carbonate electrolyte because carbon shell is a turbostratic carbon layer, or an amorphous carbon or crystalline graphite layer having different physical properties from the core.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium secondary battery comprising:
   a crystalline graphite core; and
   a carbon shell formed around the core, the carbon shell including at least one material selected from the group consisting of a transition metal, an alkali metal, an alkaline earth metal, an element of Group 3B of the Periodic table, an element of Group 4B, an element of Group 5B and a mixture thereof, and the carbon shell being one of a turbostratic carbon layer and a crystalline carbon layer having different physical properties from the core.

2. The negative active material of claim 1, wherein the transition metal is at least one metal selected from the group consisting of Ni, Co, Fe, Mo, Cr, Ti, Zr, Sc and V; the alkali metal is Na or K; the alkaline earth metal is Mg or Ca; the element of Group 3B is at least one element selected from the group consisting of B, Al and Ga; the element of Group 4B is at least one selected from the group consisting of Si, Ge and Sn, and the element of Group 5B is P.

3. The negative active material of claim 1, wherein the active material comprises 50–99 wt % of the crystalline graphite core and 1–50 wt % of the carbon shell.

4. The negative active material of claim 1, wherein a I(110)I(002) of the active material is 0.04 or less, the I(110)/I(002) being an X-ray diffraction intensity ratio of the (110) plane and the (002) plane.

5. The negative active material of claim 1, wherein a I(1360)/I(1580) of the crystalline graphite core is 0.3 or less and a I(1360)/I(1580) of the carbon shell is 0.2 or more, the I(1360)/I(1580) being Raman spectroscopy intensity ratio.

* * * * *